United States Patent

Arisaka et al.

Patent Number: 6,069,774
Date of Patent: *May 30, 2000

[54] MAGNETIC HEAD SUPPORT DEVICE FOR MAGNETIC DISC RECORDING DEVICE

[75] Inventors: Toshihiro Arisaka; Tetsuya Hamaguchi, both of Ibaraki-ken; Keiko Watanabe, Tsuchiura; Toshihiko Shimizu, Ibaraki-ken, all of Japan

[73] Assignee: Hitachi, Ltd., Tokyo, Japan

[*] Notice: This patent is subject to a terminal disclaimer.

[21] Appl. No.: 09/326,599

[22] Filed: Jun. 7, 1999

Related U.S. Application Data

[63] Continuation of application No. 08/964,231, Nov. 4, 1997, Pat. No. 5,930,082.

[30] Foreign Application Priority Data

Nov. 6, 1996 [JP] Japan ................................. 8-293855

[51] Int. Cl.⁷ ............................................. G11B 21/16
[52] U.S. Cl. ........................................................ 360/104
[58] Field of Search ................................ 360/104, 103, 360/105, 106, 107, 108, 109

[56] References Cited

U.S. PATENT DOCUMENTS

| | | | |
|---|---|---|---|
| 5,012,368 | 4/1991 | Bosier et al. | 360/104 |
| 5,237,475 | 8/1993 | Kazama et al. | 360/104 |
| 5,428,489 | 6/1995 | Takamura et al. | 360/104 |
| 5,568,332 | 10/1996 | Khan | 360/104 |
| 5,617,274 | 4/1997 | Ruiz | 360/104 |
| 5,930,082 | 7/1999 | Arisaka et al. | 360/104 |

FOREIGN PATENT DOCUMENTS

| | | |
|---|---|---|
| 55-22296 | 2/1980 | Japan . |
| 62-250570 | 10/1987 | Japan . |
| 2-192082 | 7/1990 | Japan . |
| 8-69673 | 3/1996 | Japan . |

*Primary Examiner*—David Davis
*Attorney, Agent, or Firm*—Antonelli, Terry, Stout & Kraus, LLP

[57] ABSTRACT

A magnetic recording device including a magnetic head for reading and/or writing with a magnetic recording medium which moves, a slider for holding the magnetic head on the magnetic recording medium, an actuator for moving the magnetic head, an arm, connected to the actuator, for supporting the slider, and a slider rotary support portion for attaching the slider to the support arm. The slider rotary support portion is provided with a first deformable portion, a first rigid portion, a second deformable portion and a second rigid portion which are arranged in order from the support arm. The slider is mounted on the second rigid portion with the first deformable portion and the second deformable portion being elastically deformed by a frictional force exerted on the slider during movement of the slider on the recording medium. An upstream end of a sliding portion of the slider with the magnetic recording medium in the movement direction of the magnetic recording medium is positioned, with the magnetic recording medium being stopped, on a downstream side of the movement direction of the magnetic recording medium.

2 Claims, 10 Drawing Sheets

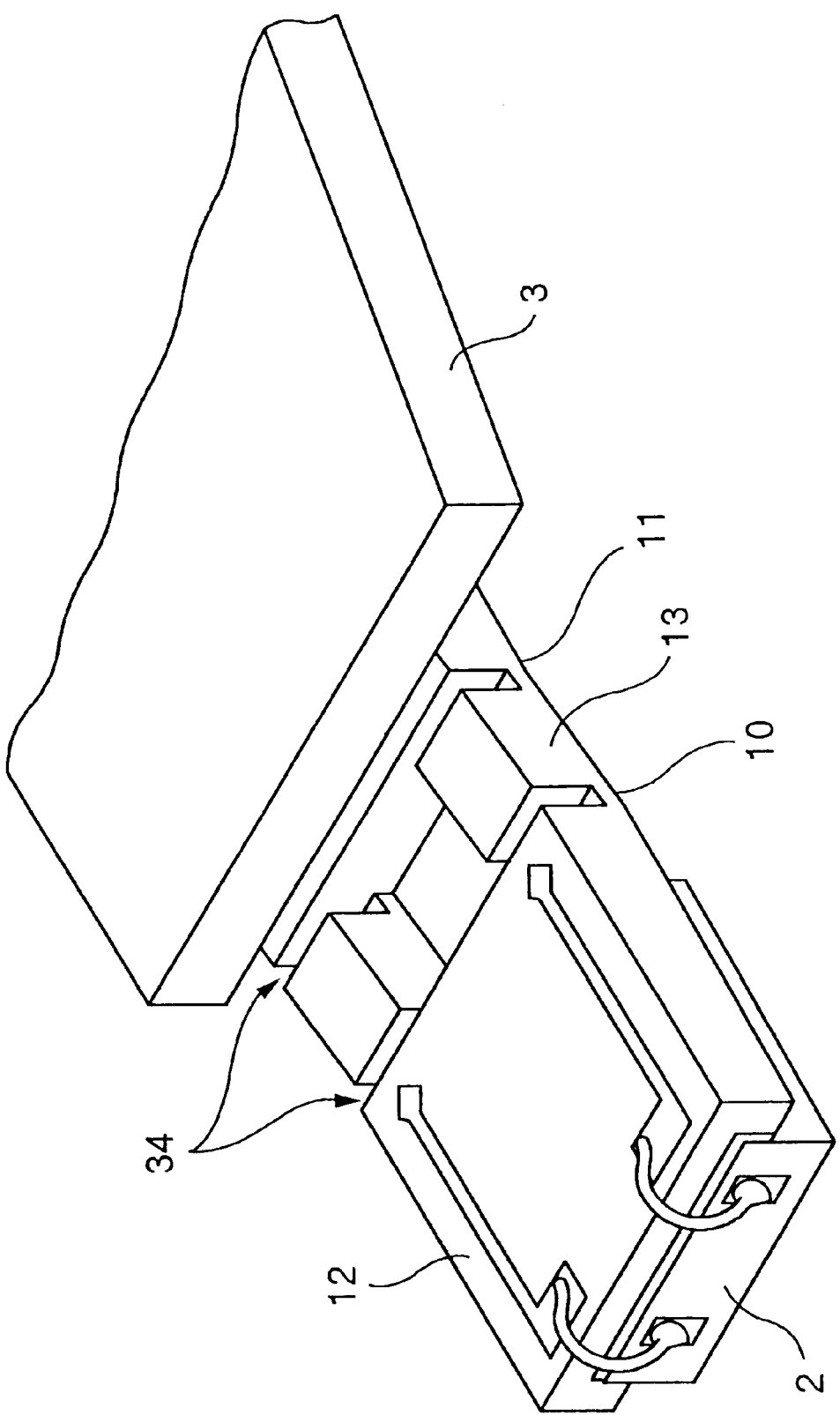

MAGNETIC HEAD SUPPORT DEVICE FOR MAGNETIC DISC RECORDING DEVICE

CROSS REFERENCE TO RELATED APPLICATION

This is a continuation of U.S. application Ser. No. 08/964,231, filed Nov. 4, 1997, U.S. Pat. No. 5,930,082 the subject matter of which is incorporated by reference herein.

BACKGROUND OF THE INVENTION

1. Field of the Invention

The present invention relates to a magnetic recording device which holds a magnetic head on a magnetic disc, a photomagnetic disc or another information recording medium, and records or reads information on or from the information recording medium by the magnetic head, particularly to a support mechanism of the magnetic head.

2. Description of the Prior Art

In a conventional magnetic recording device, on a magnetic disc (hereinafter, referred to as the disc) as a magnetic recording medium, a magnetic head element (hereinafter, referred to as the magnetic head) is floated at a predetermined distance to record and reproduce information, which is known as an air-bearing floating type of magnetic disc device. In the air-bearing floating type of magnetic disc device, usually, the magnetic head is attached to a member called a slider, and the slider is operated in a system called Contact-Start-Stop (CSS). In the system, when the disc is stopped, the slider is in contact with a disc surface (i.e. a recording face of the magnetic recording medium). From when the disc starts rotating until the disc receives a fluid force resulting from the rotation to float, the slider slides on the disc surface. Also when the disc stops rotating, a rotation speed of the disc is slowed down, thereby exerting an insufficient fluid force to the slider. Then, the slide starts sliding on the disc surface.

Also, as another conventional magnetic recording device, by sliding a magnetic head or a slider in contact with a disc, a magnetic disc device performs recording/reproducing in a contact recording system. In the magnetic disc device, the magnetic head or the slider is in steady contact with the disc.

In the magnetic head and a head support mechanism for supporting the magnetic head in the conventional magnetic disc device, as disclosed in a publication of patent application laid-open No. Sho 55-22296, to a support arm for giving to a slider a pressing load onto a disc, a gimbal portion is connected, which has a pivot as a load point and a rotation spring for rotatably supporting the slider centering on the pivot in its pitching and rolling directions. To the gimbal portion, an upper face of the slider is attached.

In many cases, the gimbal portion is formed of a thin plate, and by bending or torsional-deforming the thin plate, the aforementioned rotary support is realized. Therefore, it is difficult to form the gimbal portion integrally with the support arm which is formed of a plate having a different thickness. Usually, the gimbal portion is formed of the thin plate separately from the support arm, then welded or bonded otherwise to the support arm. A publication of patent application laid-open No. Hei 8-69673 discloses an example of forming the gimbal portion by etching.

The head support mechanism in some case includes the slider, and in another case is a combination of the support arm for supporting the slider and the gimbal portion (hereinafter, referred to as the head support arm), excluding the slider. In the following description, the head support arm is indicated unless especially described. That is to say, the head support arm includes the support arm and the gimbal portion. Also in the following description, a side of the slider opposed to the disc and its opposite side are called lower and upper faces, respectively, and upstream and downstream sides of a disc rotary direction are called forward and backward portions, respectively.

In the aforementioned head support mechanism, a rotation center in a pitching direction of the slider is above a sliding face of the slider. Therefore, when the slider receives a frictional force resulting from the aforementioned sliding on the disc, a contact force of the slider with the disc becomes very large on the upstream side of the disc rotary direction, i.e. the slider falls forward to the upstream side of the disc rotary direction. In this case, because of an unstable vibration or the aforementioned locally generated very large contact force, the slider has a possibility of damaging disc and slider surfaces.

To solve the problem, a publication of patent application laid-open No. Hei 2-192082 discloses a head support mechanism constituted in such a manner even when receiving a frictional force from a disc, a slider is prevented from falling forward. A tip of an arm attached to a carriage is provided with a parallel plate structure constituted of an upper plate and a parallel lower plate to give a load. The gimbal portion is constituted of upper and lower main plate portions, and front and rear plates which connect these main plate portions. In the support mechanism, when a frictional force acts in a backward direction of the slider, the front plate of the gimbal portion is deformed to be horizontal with a disc face, while the rear plate is deformed to be vertical with the disc face. In this case, since a rotation center of the slider in a pitching direction is below a sliding face, a forward portion of the slider is lifted up, and the aforementioned falling forward does not occur.

However, in the aforementioned head support mechanism, instead of lifting up the forward portion of the slider, a backward portion of the slider is deformed to be pressed onto the disc face. There arises a distribution (load distribution) in which a load produced on the slider sliding face is increased from the forward to backward portion. In this case, since the pressing load received by the slider itself does not change, a contact force on the backward portion of the slider is increased. Then, there is a possibility that the slider and the disc are damaged.

Also, in the head support mechanism disclosed in the publication of patent application laid-open No. Hei 2-192082, the gimbal portion has a complicated structure. A disc device is not made compact. Especially, in a laminated disc type of device, the narrowing of disc intervals or the lowering of cost is not considered.

SUMMARY OF THE INVENTION

An object of the present invention is to prevent or reduce a local increase of a contact force in sliding faces when a member for supporting a magnetic head on a disc slides on the disc.

Another object of the invention is to enlarge a portion which can be designed in common with a conventional head support mechanism and provide a magnetic recording device which can be easily developed.

To attain these and other objects, in a magnetic recording device of the invention, a tip of a support arm having a spring portion for producing a load to press a magnetic head on a recording medium is provided with a head slider rotary support portion. The rotary support portion is provided successively from an upstream side of a movement direction of the recording medium with a first deformable portion, a first rigid portion, a second deformable portion and a second rigid portion, thereby partially constituting a head support mechanism, and supports the magnetic head in a cantilever manner from the upstream side of the recording medium movement direction. For this, the first deformable portion is attached to an actuator for moving and positioning the magnetic head, and the magnetic head is mounted on the second rigid portion.

The magnetic head can be mounted on the second rigid portion via a slider having a sliding face with the magnetic recording medium. Alternatively, by using the second rigid portion also as the slider, the head can be mounted directly on the second rigid portion. However, relative to the second rigid portion, the slider does not rotate around an axis in a direction crossing the recording medium movement direction. Also, mainly the spring portion mounted on the head support arm produces the load to press the slider or the sliding face of the second rigid portion onto the recording medium.

Further, when the magnetic head is set on the stopped magnetic recording medium, an upstream end of the slider or the sliding face of the second rigid portion in the recording medium movement direction is positioned on a downstream side of the magnetic recording medium movement direction from an intersection of an extension of a virtual line straight connecting the first and second deformable portions with the recording face of the magnetic recording medium.

Preferable modes of the magnetic recording device according to aspects (1)–(13) of the invention are as follows.

(1) A magnetic recording device includes a magnetic head for reading and/or writing with a moving magnetic recording medium, a slider for holding the magnetic head on the magnetic recording medium, a support arm having a spring portion for producing a load to press the slider onto the magnetic recording medium and a slider rotary support portion for attaching the slider to the support arm. The slider rotary support portion is provided successively from the support arm with a first deformable portion, a first rigid portion, a second deformable portion and a second rigid portion, and supports the slider attached to the second rigid portion with a cantilever from an upstream side of a movement direction of the magnetic recording medium. The first and second deformable portions receive a frictional force which acts from the magnetic recording medium moving in a operation condition to the slider, to be elastically deformed in a plane which is perpendicular to a recording plane of the magnetic recording medium and parallel with an axial line connecting the first deformable portion and the second rigid portion. An upstream end of a sliding portion of the slider with the magnetic recording medium in the recording medium movement direction is positioned, with the magnetic recording medium being stopped, on a downstream side of the magnetic recording medium movement direction, from an intersection of an extension of a virtual line connecting the first and second deformable portions with the recording plane of the magnetic recording medium.

(2) In the above aspect (1), the line connecting the first and second deformable portions is a virtual line for connecting, in the plane perpendicular to the recording face of the magnetic recording medium and parallel with the axial line, a point which is a middle portion of a direction of the axial line of the first deformable portion and a middle of a thickness thereof, and a point which is a middle portion of a direction of the axial line of the second deformable portion and a middle of a thickness thereof.

(3) In the above aspects (1) or (2), the second rigid portion is provided with a frame body, a slider mounting portion, and a support portion for supporting the slider mounting portion rotatable around a rotation axis positioned parallel with the recording medium movement direction on the frame body.

(4) A magnetic recording device includes a magnetic head for reading and/or writing with a moving magnetic recording medium, a slider for holding the magnetic head on the magnetic recording medium, a support arm with a longitudinal axis and having a spring portion for producing a load to press the slider onto the magnetic recording medium and a slider rotary support portion for attaching the slider to the support arm. The slider rotary support portion is provided with a first deformable portion, a first rigid portion and a second deformable portion which are arranged successively in a direction of the longitudinal axis of the support arm from an upstream side toward a downstream side of a movement direction of the magnetic recording medium and integrally connected to one another, similarly in a direction parallel with these portions, similarly with a third deformable portion, a third rigid portion and a fourth deformable portion which are arranged successively in a direction of the longitudinal axis of the support arm from the upstream side toward the downstream side of the magnetic recording medium movement direction and integrally connected to one another, and with a second rigid portion connected to the second and fourth deformable portions, for supporting the slider attached to the second rigid portion with a cantilever from the upstream side of the recording medium movement direction. An upstream end of a sliding portion of the slider with the magnetic recording medium in the recording medium movement direction is positioned, with the magnetic recording medium being stopped, on a downstream side of the recording medium movement direction, from an intersection of an extension of a virtual line connecting the first and second deformable portions with a recording face of the magnetic recording medium and an intersection of an extension of another virtual line connecting the third and fourth deformable portions with the recording face of the magnetic recording medium.

(5) In anyone of the above aspects (1) to (4), the first and second deformable portions are formed by bending a thin plate.

(6) In anyone of the above aspects (1) to (4), the first and second deformable portions are formed by notching a thin plate.

(7) In anyone of the above aspects (1) to (4), the first and second rigid portions and the first and second deformable portions are integrally formed using a resin material.

(8) In anyone of the above aspects (1) to (7), a flexural rigidity of the second deformable portion is lower than a flexural rigidity of the first deformable portion. Thereby, in a position where a guide arm or another support arm is attached, an error in attaching the head support arm in a direction perpendicular to the recording medium face can be easily absorbed.

(9) In anyone of the above aspects (1) to (8), as the magnetic head a magnetic resistance effect reproducing element for reproducing information at least from the recording medium is provided.

(10) In anyone of the above aspects (1) to (9), the sliding portion is formed of plural sliding faces.

(11) A magnetic recording device is provided with a magnetic head for reading and/or writing with a moving magnetic recording medium, a support arm having a spring portion for producing a load to press the magnetic head onto the magnetic recording medium and a first head support portion linked to the support arm for supporting the magnetic head. The first head support portion includes a second rigid portion for supporting the magnetic head, a second deformable portion linked to an upstream side of the second rigid portion in a magnetic recording medium movement direction, a first rigid portion linked to the second deformable portion opposite to the second rigid portion and a first deformable portion linked to the first rigid portion opposite to the second deformable portion. A rigidity against deformation in a pitching direction of the first and second deformable portions is sufficiently small as compared with the first and second rigid portions. The second rigid portion is provided with a sliding portion provided with the magnetic head for sliding on the magnetic recording medium, and a second support portion for rotatably supporting the sliding portion around an axis parallel with the magnetic recording medium movement direction. An upstream end of the sliding portion in the magnetic recording medium movement direction is disposed, with the magnetic recording medium being stopped, in a plane perpendicular to a recording face of the magnetic recording medium and parallel with the magnetic recording medium movement direction, on a downstream side of the magnetic recording medium movement direction, from an intersection of an extension of a virtual line connecting middles of the first and second deformable portions with the recording medium.

(12) In anyone of the above aspects (1) to (11), a characteristic frequency of the slider rotary support portion in the magnetic recording medium movement direction is 200 Hz or less.

(13) A slider support structure holds a slider of a magnetic recording device opposed to a recording face of a magnetic recording medium. The magnetic recording device includes a magnetic head for reading and/or writing with the moving magnetic recording medium and the slider with the magnetic head mounted thereon. In the slider support structure, a suspension arm having a spring portion on a root thereof is opposed to the recording face of the magnetic recording medium while a tip portion of the suspension arm is movable in a direction substantially orthogonal to a movement direction of the recording medium. Further a tip of the suspension arm is provided with a cantilever structure having two low-rigidity portions along the movement direction of the magnetic recording medium. The slider is mounted on a tip portion of the cantilever structure on a downstream side of the movement direction of the magnetic recording medium. An intersection of an extension of a virtual line connecting the two low-rigidity portions with the recording face of the magnetic recording medium is positioned on an upstream side from an upstream end of the slider in the movement direction of the magnetic recording medium.

An action of the invention is now described. In the following, a constitution having the slider is described. The description can be applied to a constitution having the sliding portion on the second rigid portion, because the sliding face is related.

In the aforementioned constitution, when the frictional force acts between the magnetic recording medium and the slider, the first and second rigid portions or the rigid support body are hardly deformed, and the first and second deformable portion are mainly deformed. Therefore, when the first and second deformable portions are deformed, the second deformable portion can move on a circumference centering on the first deformable portion and having a radius of a distance between the first and second deformable portions, and on a circumference centering on a sliding point of the slider and having a radius of a distance between the sliding point and the second deformable portion. The sliding point is a point receiving a resultant force of the frictional force when the frictional force of actual sliding acts on the sliding face, and is varied in the sliding face in accordance with a sliding condition. In the invention, however, by considering an application point of a force acting in a direction to expand the slider rotary support portion, the sliding point can be regarded as the upstream end of the slider or the sliding face in the recording medium movement direction when the head support mechanism is seen from a direction parallel with the recording medium face and across the recording medium movement direction (from a side).

The upstream end of the sliding face in the recording medium movement direction is positioned, with the magnetic recording medium being stopped, in the plane perpendicular to the recording face of the magnetic recording medium and parallel with the axial line connecting the first and second deformable portions (or the direction of the frictional force acting on the sliding face), on the downstream side of the recording medium movement direction, from the intersection of the extension of the virtual line connecting (the middles of) the first and second deformable portions with the recording medium. Then, the second deformable portion has the following positional relationship. Specifically, when the recording medium is stopped, the second deformable portion is positioned on one of intersections of the aforementioned two circumferences. When the sliding point receives the frictional force from the moving magnetic recording medium, the second deformable portion can move only to the other intersection. In the invention, the displaceable position (the other intersection) is more distant from the magnetic recording medium than the position of the second deformable portion when the magnetic recording medium is stopped. Also the rotation center of the slider in the pitching direction is the intersection of the extension of the virtual line connecting the first, and second deformable portions with a perpendicular at the sliding point on the sliding face exerted by the frictional force. Therefore, the rotation center is positioned on a magnetic recording medium side of the sliding face.

In this case, when the magnetic recording medium slides on the slider while moving, exerting the frictional force to the slider sliding face, then the frictional force elastically deforms the first and second deformable portions in such a manner the rotary support portion is entirely expanded in the direction of the frictional force. At the time of deformation, as aforementioned, the second deformable portion is displaced apart from the recording medium. Therefore, a load applied to the slider is reduced, and the slider is also slightly displaced in a direction to lift up the upstream side (hereinafter, referred to as the forward portion) of the slider in the recording medium movement direction. The magnetic recording medium and the slider are in contact with each other while being elastically deformed. The displacement of the slider places a face-pressure distribution of the slider sliding face in a condition where the forward portion has a reduced pressure and the backward portion has an increased pressure. When the acting force (frictional force) and the displacement are large, the forward portion is in some case lifted up. Also in this case, theoretically the load is reduced. Therefore, the face pressure of the sliding face on the outflow side is also prevented from becoming larger than an initial average face pressure. Consequently, the slider can be prevented from falling forward, and an unstable vibration can be avoided accordingly.

Also, when the frictional force acts, due to the aforementioned action, the load applied in the direction to press the slider onto the disc face is decreased. Therefore, another action of decreasing the frictional force, reducing variations in frictional force and making uniform the frictional force can be expected.

Also, when the slider is set on the magnetic recording medium with a predetermined load and the slider sliding face is tilted in the rolling direction relative to the disc face, then the support portion for supporting the slider mounting portion on the frame body is twisted and deformed to place the slider sliding face parallel with the disc face. Therefore, even when the slider is tilted in the rolling direction because of errors in the mounting portion, processing errors and the like, these errors can be absorbed.

As another constitution for correcting the error in the rolling direction, in the same manner as the first and second deformable portions and the first rigid portion, the third and fourth deformable portions and the third rigid portion are provided parallel, and the second and fourth deformable portions are connected to the second rigid portion. In the constitution, when the slider, i.e. the second rigid portion is tilted in the rolling direction, the first deformable portion, the second and third deformable portions, and the fourth deformable portion can be independently deformed as aforementioned, to absorb the error.

Also when the resin material is used, since the resin material has a high attenuating effect, the vibration of the magnetic head and the head support mechanism can be suppressed, In addition to the reduction of the aforementioned unstable vibration caused by the falling-forward slider, the vibration is further attenuated by the resin material. Then, the magnetic head can be stably supported from when the recording medium is started until rotated steady. This is effective for performing the recording/reproducing operation at a high speed, especially in the contact recording system.

Also, by setting the characteristic frequency of movement of the sliding face in the magnetic recording medium movement direction as the first and second deformable portions are deformed to 200 Hz or less, when the frictional force is applied to the slider while sliding, then the slider does not respond to a frequency equal to or larger than the characteristic frequency. Therefore, no vibration is caused by a variation component of the frictional force having a high frequency of 200 Hz or more.

According to the invention, when the slider slides in contact with the disc and receives the frictional force, the front end of the slider can be displaced apart from the disc face without locally increasing the load to press on the disc. Therefore, the unstable vibration caused by the falling forward and the local increase of the contact force can be prevented or reduced. Damages on the slider and the recording medium are reduced, and highly reliable head support mechanism and magnetic recording device can be provided.

Also when the invention is used in the contact recording system, the unstable vibration and the local increase of the contact force can be prevented or reduced. Therefore, a highly reliable magnetic recording device can be provided.

Also according to the invention, the head slider rotary support portion itself can prevent the slider sliding condition from becoming unstable because of friction. By replacing the gimbal portion for use in the prior-art head support mechanism of the floating slider system with the rotary support portion attached to the support arm, the head support mechanism of a contact slider system can be constituted. In this case, to set the pressing load of the slider to a desired value, the spring portion of the support arm need to be designed by changing its rigidity or the like. However, since the entire length and the like of the head support mechanism can be the same, at the time of designing the magnetic disc device, other design portions to be changed can be advantageously minimized.

BRIEF DESCRIPTION OF THE DRAWINGS

FIG. 7 is a perspective view of a rotary support mechanism and a slider according to a fourth embodiment of the invention.

DETAILED DESCRIPTION OF THE PREFERRED EMBODIMENTS

Embodiments of the present invention are now described with reference to the accompanying drawings.

Figure 10A:
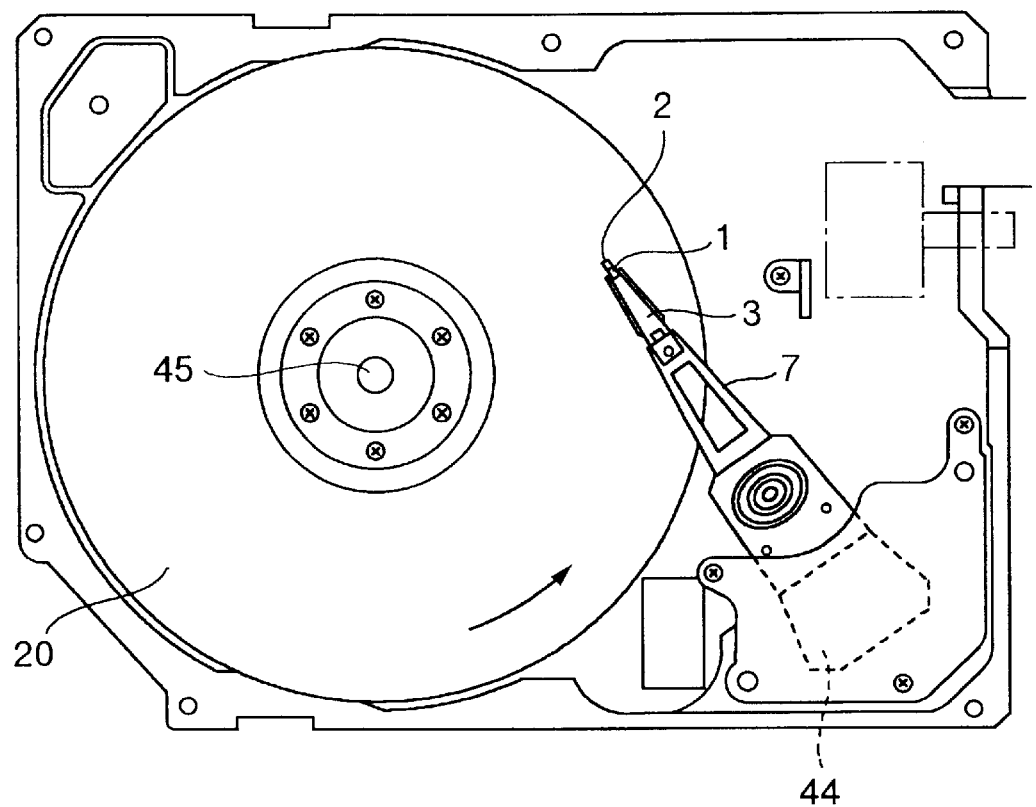
FIGS. 10A and 10B are plan and partial sectional views of a magnetic disc device to which the invention is applied, respectively.
Figure 10B:
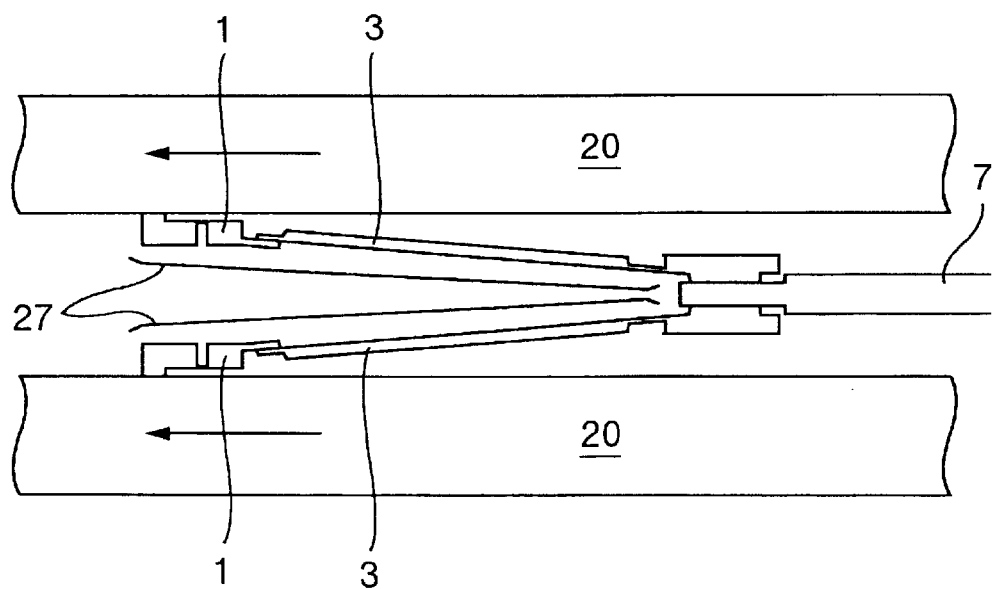

FIG. 10 shows a magnetic disc device accordance to a first embodiment of the invention: FIG. 10A is a plan view of the entire magnetic disc device and FIG. 10B is a side view of a head support mechanism 27 set relative to magnetic discs. As shown in the figures, the device is constituted of a spindle motor 45 for holding and rotating plural magnetic discs 20, a magnetic head disposed above the magnetic discs for reading/writing information with the magnetic discs, a slider 2 with the magnetic head attached thereto, the head support mechanism 27 having the slider 2 attached to a tip thereof, a guide arm 7 bonded to the head support mechanism 27, and a voice coil motor 44 bonded to the guide arm 7 for moving the guide arm 7 and the head support mechanism 27 to position the magnetic head in a desired position on the magnetic discs.

The head support mechanism 27, as shown in FIG. 10B, includes slider rotary support portions 1 (hereinafter, referred to as the rotary support mechanism) with the slider 2 mounted thereon, support arms 3 for supporting the rotary support mechanism 1 and a mount 5 for attaching the support arms 3 to the guide arm 7. The guide arm 7 is attached to the voice coil motor 44. Thereby, the slider 2 and the magnetic head (head element) attached thereto can move in a radius direction of the magnetic discs 20 as information recording media.

In the aforementioned constitution, the invention relates to the rotary support mechanism 1 and the slider 2 partly constituting the head support mechanism 27. In the following, these are mainly described, and the description of the other constitution is omitted.

Figure 1:
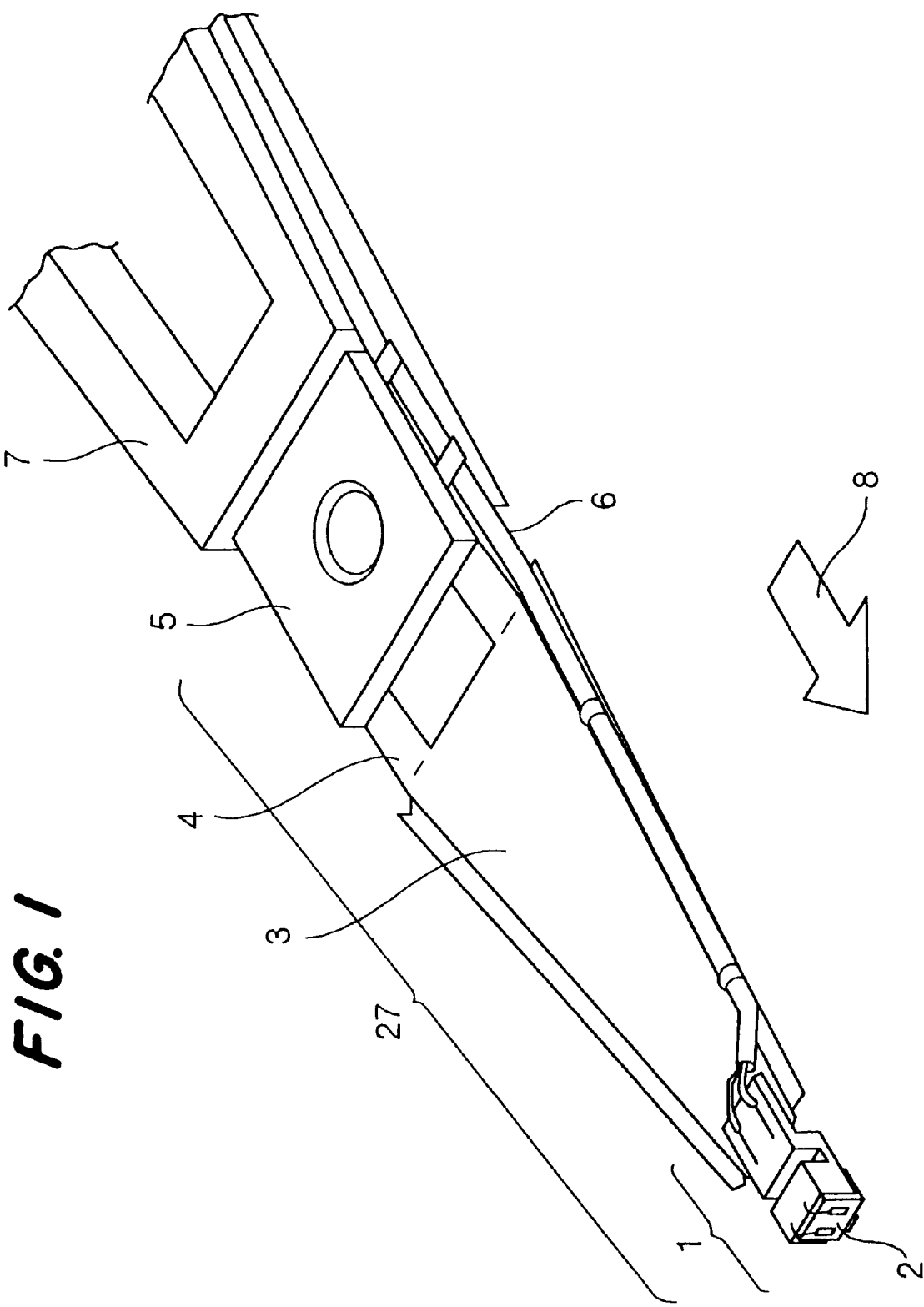
FIG. 1 is a perspective view of a head support mechanism and a slider according to a first embodiment of the invention.

FIG. 1 is a perspective view of the head slider and the head support mechanism according to the first embodiment of the invention. The support arms 3 are attached via the mount 5 to the guide arm 7 which is driven by a not-shown actuator (voice coil motor). To a tip of one support arm 3, the slider 2 is supported via the rotary support mechanism 1 in a cantilever manner. The head support mechanism 27 in some case includes the slider 2, and is in another case referred to as a combination of the rotary support mechanism 1, the support arms 3 and the mount 5 excluding the slider 2. In the following, the latter is referred to unless especially described.

Figure 2:
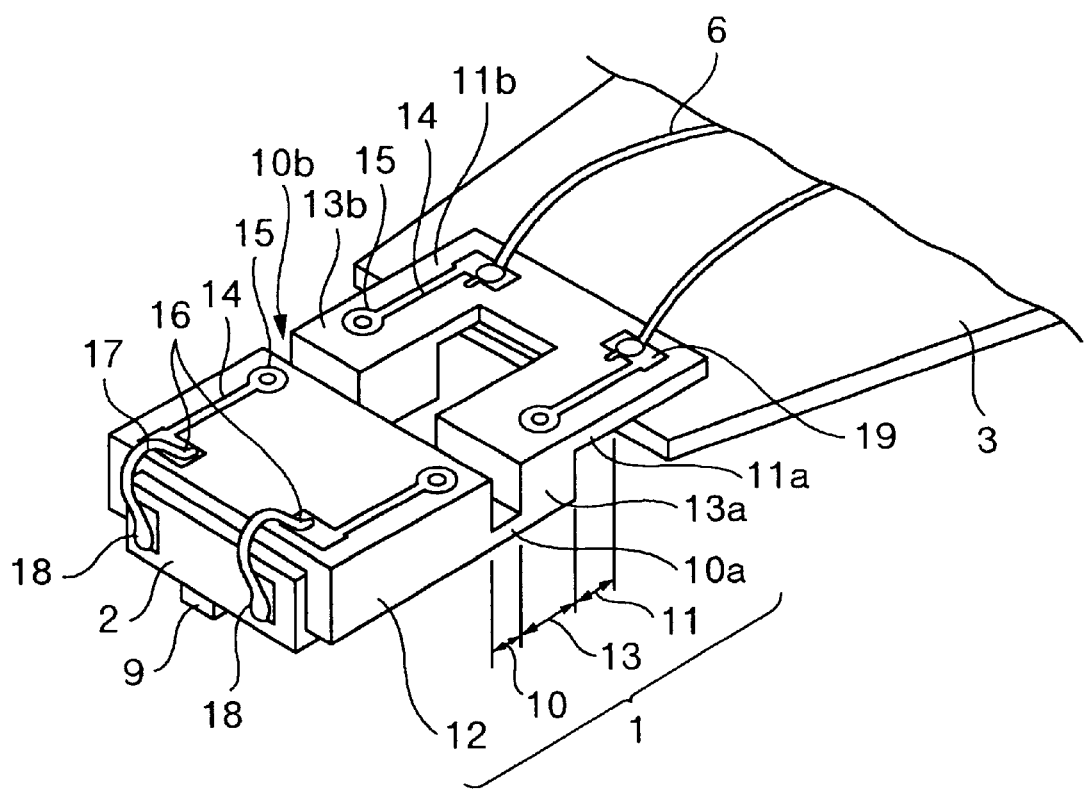
FIG. 2 is a perspective view showing a partial detail of the first embodiment.

FIG. 2 is an enlarged perspective view of a periphery of the rotary support mechanism 1 of FIG. 1. Further in FIG. 1, an arrow 8 indicates a movement direction of the recording medium (magnetic disc) relative to the head support mechanism 27. In the following, the direction indicated by the arrow 8 is called the downstream of the recording medium movement direction, and a reverse direction is called the upstream.

On an rear-end face of the slider 2 (the end face on the downstream side of the recording medium movement direction), a magnetic head (head element) 9 is provided for recording and reproducing. In the embodiment, the rotary support mechanism 1 is constituted of a thin plate of resin. Successively from the support arm 3 disposed are a first deformable portion 11, a first rigid portion 13, a second deformable portion 10 and a second rigid portion 12. The deformable portion 11 is a thin portion which is formed by processing a groove in a face opposed to the recording medium by a laser process, an etching process or the like in a depth direction substantially perpendicular to a recording face of the recording medium and in a longitudinal direction orthogonal to the recording medium movement direction and parallel with the recording medium recording face. The deformable portion 10 is a thin portion which is formed by performing the same process from the opposite face. Since the rigid portion 13 in the figure has a larger thickness (dimension in a direction perpendicular to the recording medium recording face) than the deformable portions 10 and 11, its rigidity is sufficiently high to form the rigid portion.

A front end of the deformable portion 11 is overlapped and attached to an upper face of the support arm 3. In a portion of the deformable portion 11 which does not overlap the upper face of the support arm 3, the rigid portion 13 and the deformable portion 10, a middle portion in a width direction (the direction substantially orthogonal to the arrow 8) is cut away. Specifically, the deformable portion 11 is divided to deformable portions 11a and 11b which are arranged in parallel via a middle clearance. The deformable portion 10 is divided to deformable portions 10a and 10b which are arranged in parallel via a middle central clearance. The rigid portion 13 is similarly divided to rigid portions 13a and 13b which are arranged in parallel via a middle clearance. En the rigid portion 12, to suppress its entire height, a groove is made in the resin thin plate by processing a groove from the side opposed to the recording medium in the depth direction. In the groove the slider 2 is embedded and bonded. Therefore, the rigid portion 12 is sufficiently rigid. Since the rotary support mechanism 1 is constituted in this manner, it can be supposed that in the rotary support mechanism 1 only the deformable portions 10 and 11 are deformed especially in a pitching direction.

Slider terminals 18 provided on a rear-end face of the slider 2 and terminals 16 provided on an upper face of the rigid portion 12 are connected via wires 17 which are welded by wire bonding, respectively. Wirings 14 extending from the terminals 16 to the support arm 3 are linked to a lower face of the rigid portion 12 via through holes 15 provided in a front portion of the rigid portion 12, as hidden in FIG. 2, extend across the deformable portion 10 and are connected to the through holes 15 in the rigid portion 13. The wirings 14 similarly extend across an upper face of the deformable portion 11, and are connected to root terminals 19 disposed on a front end of the deformable portion 11, respectively. In the embodiment, signal conductors 6 are soldered to the root terminals 19 for transmitting a recording/reproducing signal. Instead of the signal conductors 6, an integral wiring structure can be formed on the support arm 3 by evaporation or the like. In such a constitution, a process of attaching the signal conductors 6 can be omitted, thereby enhancing productivity. Here, an example of two wirings is depicted. When a magnetic resistance effect (MR) head is used for reproduction of the magnetic head, however, the number of wirings is four.

FIG. 3 is a side view along a medium movement direction of the rotary support mechanism 1 and the slider 2. An operation of the rotary support mechanism 1 in the embodiment is now described using FIG. 3.

Figure 3A:
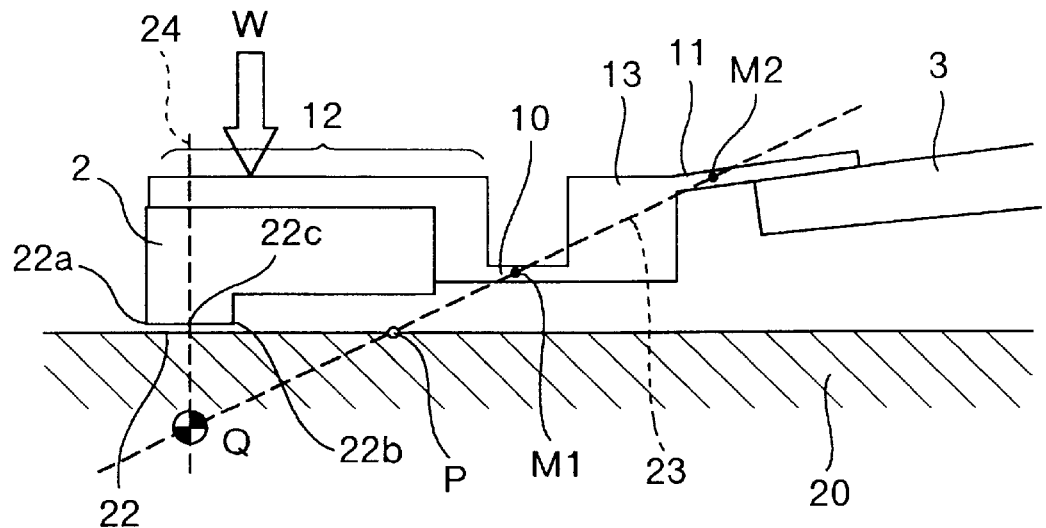
FIGS. 3A and 3B are side views showing operations of the embodiment shown in FIG. 2.

FIG. 3A shows that the slider 2 is set on the disc 20 as the recording medium and a load W is applied for pressing the slider 2 onto the disc 20 by a spring portion 4 of the support arm 3, which is not shown in FIG. 3. In this case, the recording medium stands still. In this condition, since a slider sliding face 22 is parallel with a disc surface, the deformable portions 10 and 11 are slightly deformed, and the support arm 3 is slightly tilted in a direction to lower the downstream side. In this condition, the rotary support mechanism 1 is constituted in such a manner that an intersection P of an extension 23 of a virtual line connecting a bending center M1 of the deformable portion 10 and a bending center M2 of the deformable portion 11 with the surface of the disc 20 is positioned on the upstream side of a sliding direction (recording medium movement direction) from sliding portions 22a and 22b of the slider 2.

Here, the bending center is defined as an intersection of tangent lines of bending center lines in both ends of the deformable portion, when the deformable portion is bent and deformed. However, since the deformable portion is usually deformed slightly, the bending center may be positioned on a bending center line in the middle of the deformable portion, provided that a thickness of the deformable portion is uniform.

When a middle between the sliding portions 22a and 22b is a sliding point 22c, a momentary rotation center Q of the slider 2 is an intersection of the extension 23 of the line connecting the bending centers M1 and M2 of the deformable portions with a perpendicular 24 at the sliding point 22c on the sliding face, and is positioned inside the disc face as shown in the Figure.

Figure 3B:
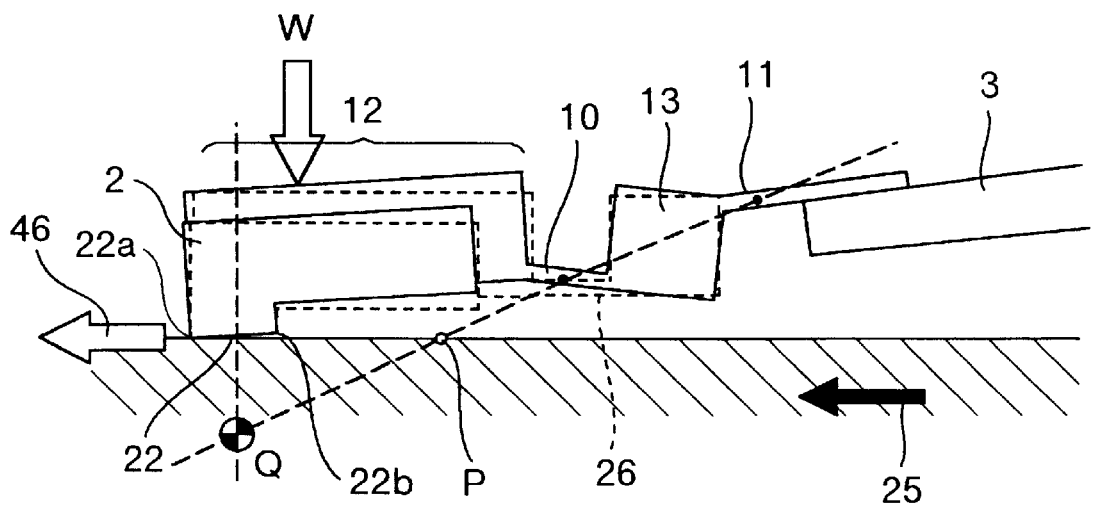

In this condition, the device is started. When the disc 20 rotates in a direction shown by an arrow 25, exerting a frictional force 46, then a condition shown in FIG. 3B is obtained. In FIG. 3B, a dotted line 26 shows the condition of FIG. 3A. While the rotary support mechanism 1 is entirely expanded by the frictional force 46 in the sliding direction, and the deformable portion 10 is displaced apart from the disc face. Then, the front end of the rigid portion 12 is displaced apart from the disc face. In this case, a pressing load W' becomes smaller than the initially set load W. Specifically, the sliding face 22 of the slider 2 is displaced in a direction in which the inflow (slider front) end 22b is lifted up around the slider momentary rotation center Q.

Actually, since the disc 20 and the slider 2 are elastically deformed, the inflow end 22b of the sliding face 22 is not completely detached, and there is supposedly produced a distribution of a face pressure which increases from the inflow side toward the outflow side. The face pressure distribution can be designed optionally in accordance with lengths of the rigid portions 12 and 13 and rigidities of the deformable portions 10 and 11 in the rotary support mechanism 1.

In the aforementioned operation, when a large frictional force is applied to the slider at the time of sliding, a load for pressing the slider 2 onto the disc face is also largely decreased. As a result, the frictional force is decreased. When there is a variation in frictional force while the disc 20 rotates once, by using the head support mechanism provided with the slider 2 and the rotary support mechanism 1 of the embodiment, a large frictional force can be effectively decreased largely and a small frictional force can be decreased a little. Consequently, the frictional force is uniformed. This is effective especially for realizing a stabilized contact in the contact recording system in which a steady sliding is performed.

Figure 4:
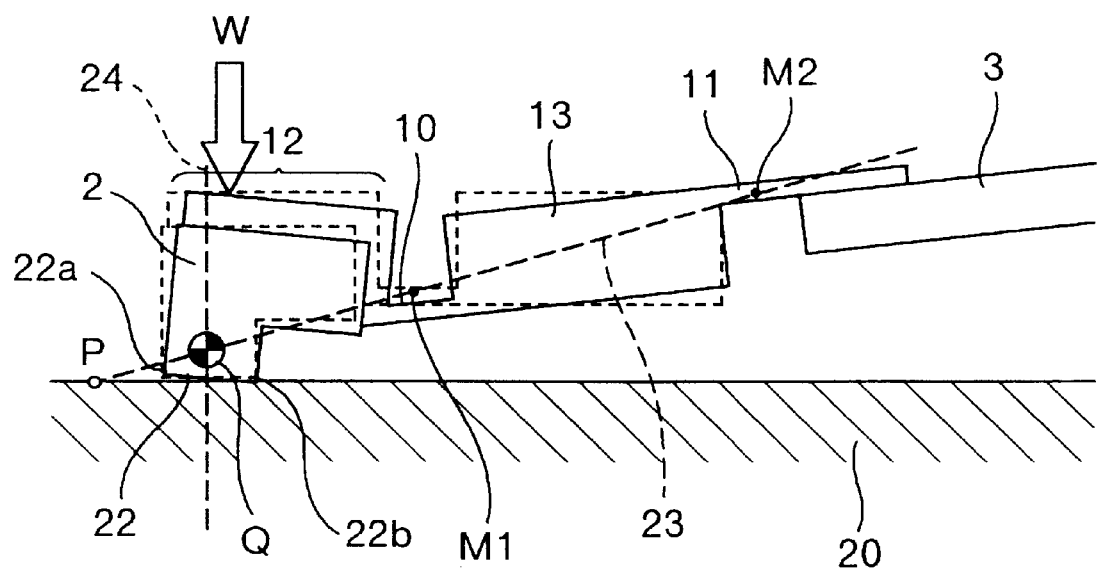
FIG. 4 is a side view showing an operation of a head support mechanism different from the invention.

A difference in operation of an example which does not belong to the invention is described using FIG. 4. In the same manner as FIG. 3B, FIG. 4 shows a condition where a frictional force is exerted. Dotted lines show a stationary condition where a head support mechanism is set on the disc 20, and solid lines show a condition where the rotation of the disc 20 exerts the frictional force. The example shown in FIG. 4 is similar to FIG. 2 in configuration of the rotary support mechanism 1, but is different from the first embodiment in that the intersection P of the extension 23 of the virtual line connecting the bending center M1 of the M2 of the deformable portion 10 and the bending center deformable portion 11 with the disc face is positioned on the downstream side of the sliding direction from the slider sliding face 22.

In this case, the rotation center Q of the slider 2 is positioned on the slider side of the sliding face. When the frictional force acts on the sliding face, the slider 2 is rotated around the point Q, and the forward portion of the sliding portion is displaced in a direction to be pressed onto the disc 20. Then, the slider falls forward (falls down toward the upstream side of the disc rotation direction). Also in this case, since the deformable portion 10 is also deformed in a direction to be pressed onto the disc, the pressing load and also the frictional force applied to the sliding face are increased. In this condition, a large frictional force disturbs an attitude of the slider, causing an unstable vibration, and the sliding becomes indirect. Therefore, the recording/reproduction cannot be achieved.

It goes without saying that in a critical state where the slider 2 fails to fall forward (tilt toward the inflow end), the intersection P of the extension 23 of the virtual line with the disc face overlaps the sliding point on the sliding face. Specifically, the rotation center Q of the slider 2 is on the sliding face 22. In this condition, even when the frictional force acts, the slider 2 fails to fall forward, or the inflow end 22b fails to rise. Such state is included in the invention, in which a stable sliding is possible. However, the state is in a very narrow scope, and a small margin is allowed for a variation in sliding point and various errors.

Also in the first embodiment, since a resin material is used in the rotary support mechanism 1, a high attenuating effect the resin material has can be used, thereby increasing an effect of suppressing the vibration of the magnetic head and the rotary support mechanism 1.

Also, since the resin material is used, the second and first deformable portions 10 and 11 have a small flexural rigidity, and a characteristic frequency of movement of the sliding face (slider 2) in the medium movement direction by means of deformation of these portions is 200 Hz or less. Therefore, when the head support mechanism 27 is used to perform a contact recording, the slider 2 does not respond to a frequency equal to or larger than the characteristic frequency because of inertial delay. Therefore, the slider is not activated by a vibration component of the frictional force having a high frequency of 200 Hz o r more among vibration components of the frictional force exerted on the sliding face when the disc slides.

In FIG. 2, the second deformable portion 10, the first deformable portion 11 and the rigid portion 13 are divided into two, respectively. Specifically, a row connecting 10a, 13a and 11a (hereinafter, referred to as the right support row) and a row connecting 10b, 13b and 11b (hereinafter, the left support row) are formed. In the above description, when the slider 2 is set on the disc 20, there is no setting error or the like in the head support mechanism 27, and the slider 2 fails to tilt in a rolling direction. In this case, the right and left support rows are set at the same angle, and are operated in the same manner.

On the other hand, when the slider 2 is tilted in the rolling direction because of errors in a mounting portion when assembling the device, processing errors and the like, the tilt is indicated by a difference in height of connecting portions of the rigid portion 12 with the deformable portions 10a and 10b of the respective rows. However, in this case, the attitude is set by deforming each row independently. As a result, the error in the rolling direction is absorbed and eliminated.

Figure 5:
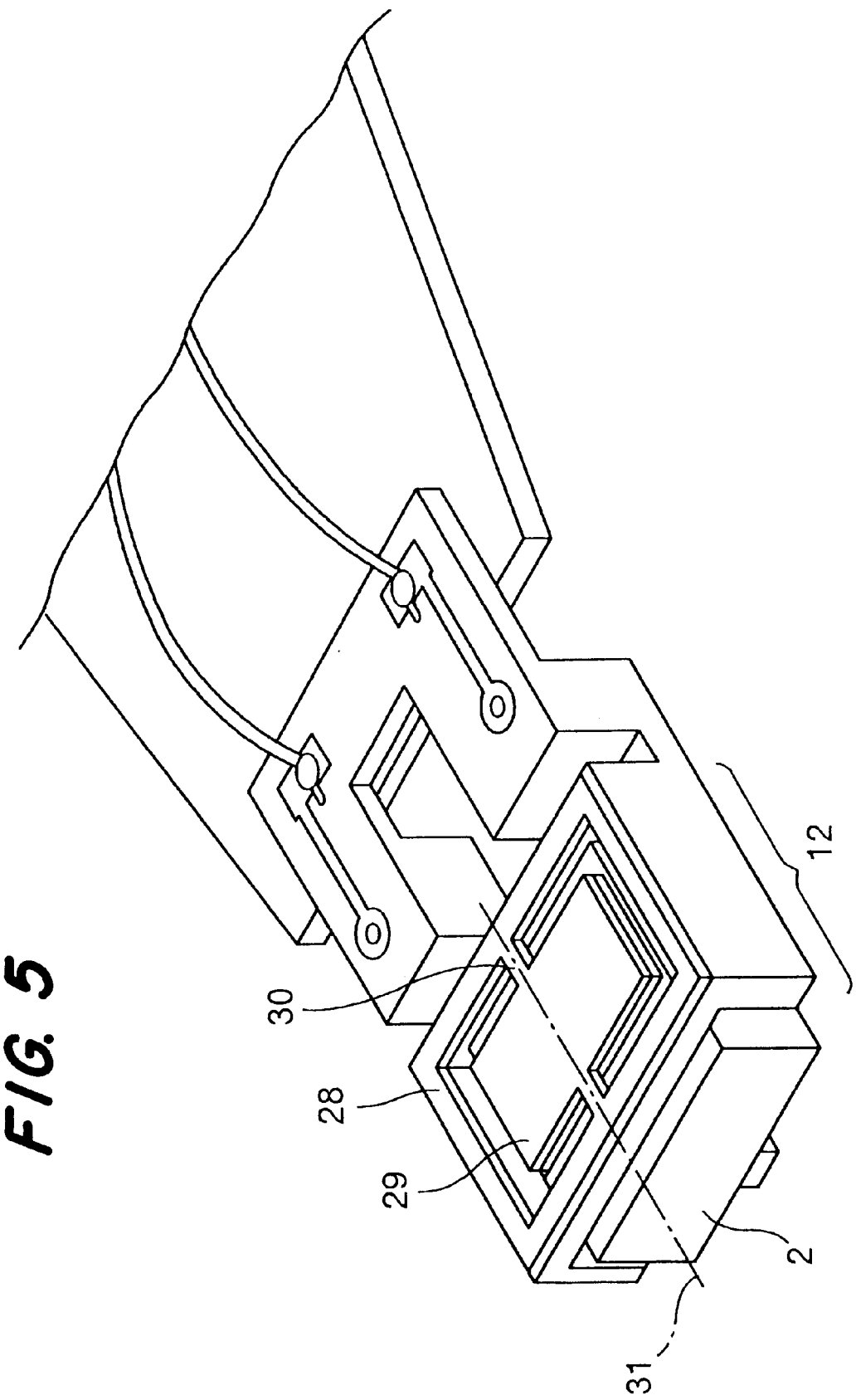
FIG. 5 is a perspective view of a rotary support mechanism and a slider according to a second embodiment of the invention.

FIG. 5 shows the rotary support mechanism 1 according to the second embodiment of the invention for absorbing the setting error in the rolling direction. In the Figure, the rotary support mechanism 1 is constituted by cutting out a middle portion of the rigid portion 12 in the rotary support mechanism shown in FIG. 2, and bonding a frame body 28 formed of an etched thin plate on an upper face of the rigid portion 12. A slider bonding portion 29 with the slider 2 bonded on a lower face thereof and the frame body 28 are connected by a narrow support portion 30 as a second support portion for rotatably supporting the slider bonding portion 29 only around an axial line 31 positioned on the frame body 28 parallel with the recording medium movement direction. In such a rolling-direction gimbal structure, when the slider 2 is tilted, a rotary moment in a direction apart from a disc face acts on a portion of the slider 2 in contact with the disc face. The rotary moment twists and deforms the narrow support portion 30 and pushes up the contact portion of the slider 2. Conversely, the slider bonding portion 29 is rotated in a direction to push down a portion of the slider 2 not contacting the disc face, so that the slider sliding face 22 is set parallel with the disc face. By operating the slider bonding portion 29 and the narrow support portion 30 in this manner, the setting error in the rolling direction of the slider 2 is absorbed and eliminated.

In the rolling-direction gimbal structure shown in FIG. 5, the number of manufacture processes is increased as much as a process of forming and bonding the gimbal thin plate as compared with the two-row support structure of FIG. 2. However, the rigidity of the rotary support mechanism 1 in a direction perpendicular to the medium movement direction is raised. Accordingly, the characteristic frequency in a vibration mode in which the rigid portion 12 (including the slider 2) shakes is increased. Therefore, when the magnetic head tracks and moves (moves in the medium movement direction and the perpendicular direction), a control band can be advantageously enlarged.

Figure 6:
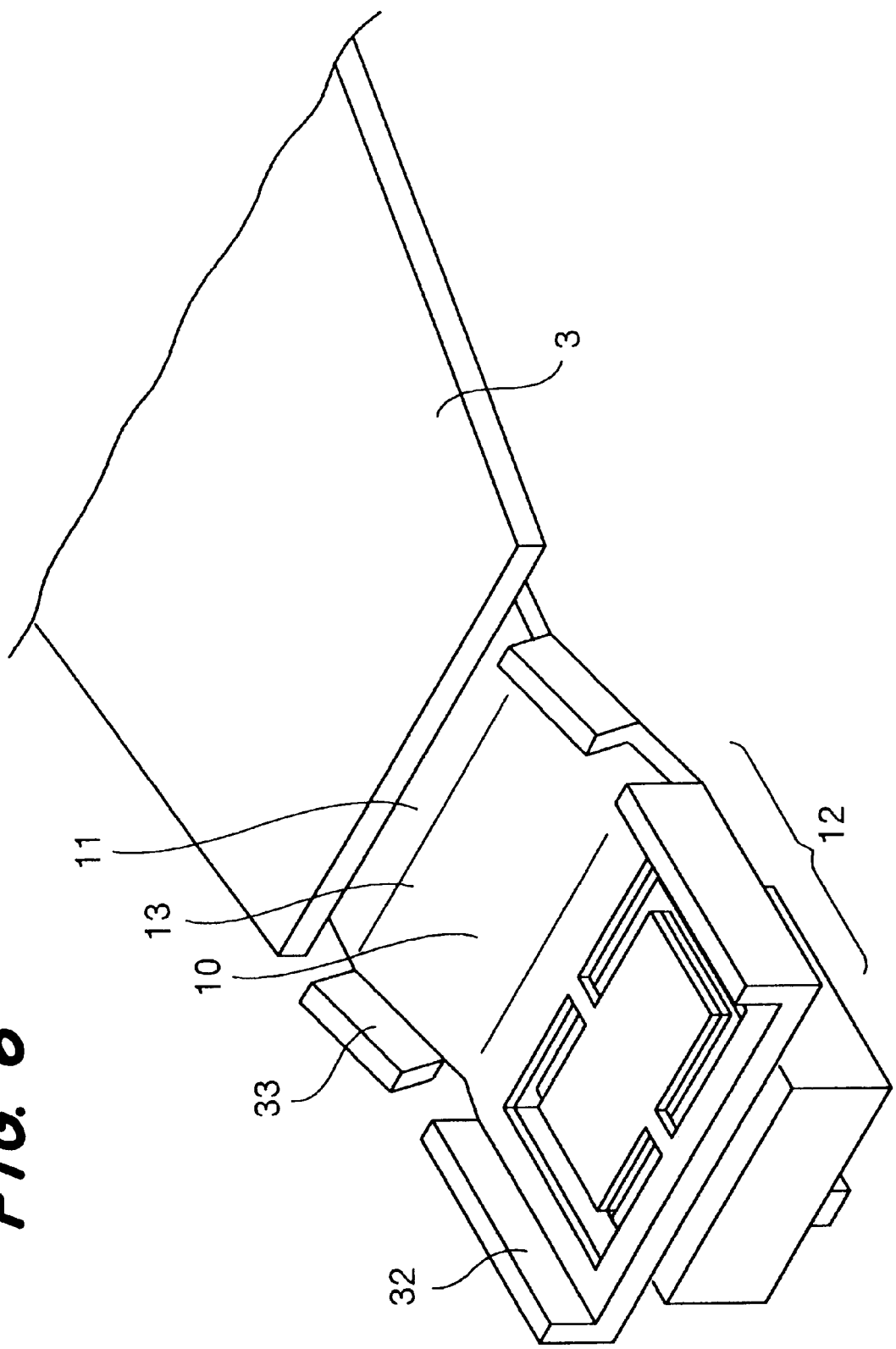
FIG. 6 is a perspective view of a rotary support mechanism and a slider according to a third embodiment of the invention.

FIG. 6 shows a third embodiment of the invention. In the embodiment, the rotary support mechanism 1 is constituted by folding a thin plate. In the rotary support mechanism 1 shown in the Figure, by bending both ends of the width direction of the thin plate upward to form a flange and partially notching both sides of the width direction of the flange symmetrically, the deformable portions 10 and 11 are formed.

As shown in FIG. 6, in the rotary support mechanism 1, successively from the support arm 3 arranged are a mounting portion attached to a lower face of the support arm 3, the deformable portion 11 continued from the mounting portion, the rigid portion 13 continued from the deformable portion 11, the deformable portion 10 continued from the rigid portion 13 and the rigid portion 12 continued from the deformable portion 10. The rigid portions 12 and 13 are provided with flange portions 32 and 33 on both sides in the width direction. The deformable portions 10 and 11 are bent beforehand in such a manner that in a plane perpendicular to the disc face and parallel with the recording medium movement direction, the intersection P of the extension of the virtual line passing the bending centers M1 and M2 of the deformable portions with the disc face is positioned on the upstream side of the slider sliding face in the recording medium movement direction. More preferably, with the slider 2 being pressed onto the disc face with the load W by the spring portion 4 of the support arm 3, since the deformable portions 10 and 11 are slightly deformed, an initial bending angle is set in such a manner the aforementioned positional relationship of the sliding face and the intersection P is satisfied under the load W.

By forming the flange portions 32 and 33 on both transverse ends of the rigid portions 12 and 13, the flexural rigidity is increased in the plane which is perpendicular to the disc face and parallel with the recording medium movement direction.

In the embodiment of FIG. 6, the rigid portion 12 is further provided with the rolling-direction gimbal structure as shown in FIG. 5. However, by dividing the deformable portions 10 and 11 and the rigid portion 13, the two-row support structure shown in FIG. 2 can be effectively formed.

Alternatively, in the same manner as in the third embodiment, as a material of the rotary support mechanism 1 a thin plate is used. Instead of bending portions intended as rigid portions to form flanges and the rigid portions 12 and 13, portions intended as deformable portions can be half-etched to reduce a thickness, thereby forming the deformable portions. Also in this case, the two-row support structure shown in FIG. 2 or the rolling-direction gimbal structure shown in FIG. 5 can be used.

FIG. 7 illustrates the rotary support mechanism 1 which is constituted of a resin thin plate in the same manner as shown in FIG. 2. Instead of processing grooves in opposite faces of the portions intended as deformable portions, grooves 34 are processed in the same face (opposite to the disc face) to form the deformable portions 10 and 11. Further, a transverse middle portion of the deformable portions 10 and 11 and the rigid portion 13 therebetween is taken away to constitute the rotary support mechanism 1 having the two-row support structure. Also, instead of the two-row support structure shown in FIG. 7, the rolling-direction gimbal structure can be used in the second rigid portion 12. Both in the embodiments shown in FIGS. 6 and 7, to facilitate assembling, a wiring from the magnetic head preferably has a wiring integral structure formed on a thin plate by evaporation or the like.

FIG. 8 shows the rotary support mechanism 1 according to a fifth embodiment of the invention. In the previous embodiments, the slider 2 with the magnetic head mounted thereon is bonded to the rotary support mechanism 1. The rotary support mechanism shown in FIG. 8 is an example of an integrated structure body including a head element and wiring. The integrated structure body described herein is related with a method of manufacturing the rotary support mechanism, the head element and the slider. Here, it is defined as a structure body which is obtained by manufacturing the rotary support mechanism of the invention with a thin film forming technique. In the manufacture process, the head element is embedded in the mechanism. Alternatively, after forming the support arm, a head element portion is formed directly on a rear end of the second rigid portion. In the integrated structure body, different from the bonding or the rotary support mechanism to the slider with the head element formed thereon, a head mounting position can be prevented from being deviated, while processes of connecting and positioning the element and the wiring can be omitted, thereby saving cost. Another advantage is that as compared with the bonding of the slider, the entire device can be easily low-profiled and made small.

Figure 8A:
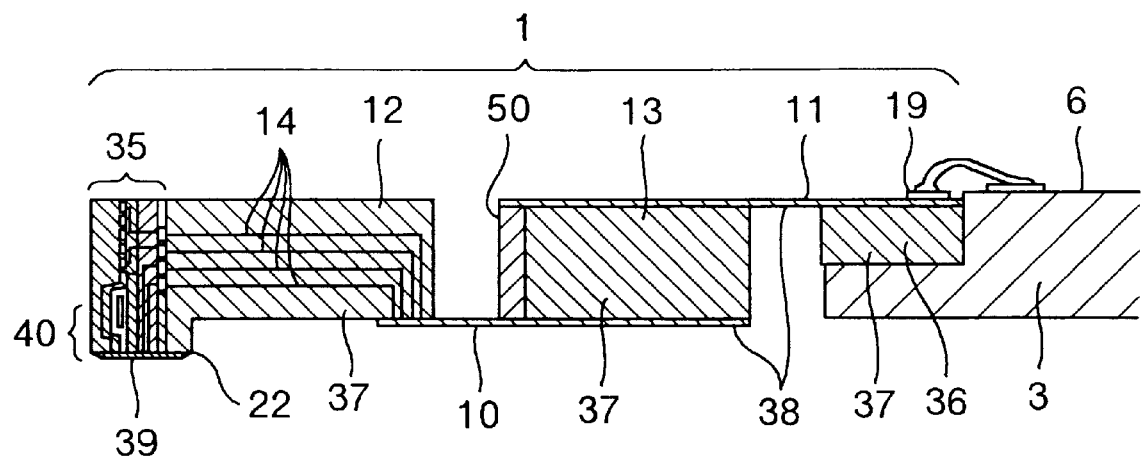
FIGS. 8A and 8B are sectional views of a rotary support mechanism integral with a magnetic head according to a fifth embodiment of the invention.
Figure 8B:
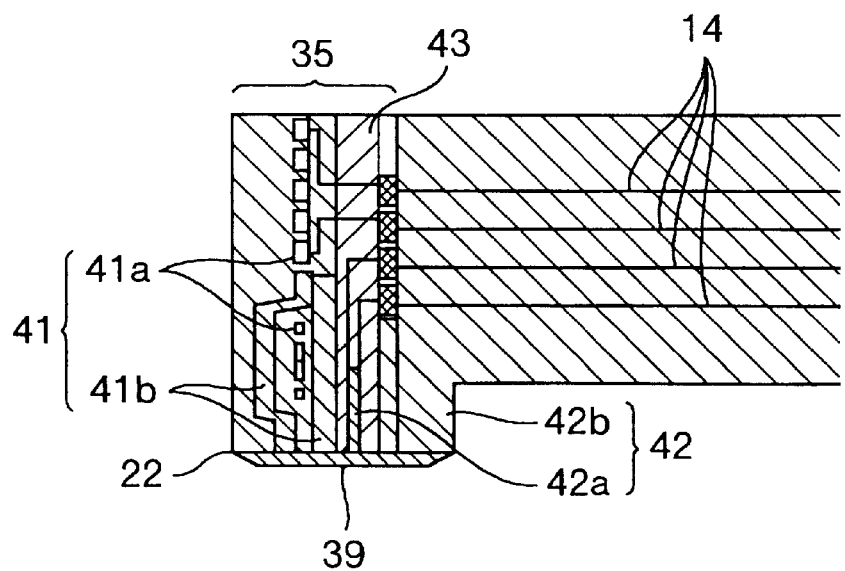

In FIG. 8, FIG. 8A shows an example of forming the rotary support mechanism 1 as a first head support portion in the integrated structure body, and FIG. 8B is an enlarged view of a head element 35 of FIG. 8A. The deformable portions 10 and 11 also serving as wirings are formed of only a copper or gold thin film or in sandwich structures 38 sandwiched with an insulating film of Al (aluminum) 203 or the like. The copper or gold thin film, $Al_2O_3$ or the like may be divided in accordance with the necessary number of wirings. The rigid portions 12 and 13 and a mother material 37 of a support arm mounting portion 36 are formed by sputtering $Al_2O_3$ on the sandwich structures 38. To electrically connect the sandwich structure 38 of the second deformable portion 10 and the sandwich structure 38 of the deformable portion 11, a conductor 50 of copper, gold or the like is formed therebetween. The wirings 14 are preferably constituted in the mother material 37 of the rigid portion 12. Alternatively, the wirings 14 are formed on a surface of the mother material by sputtering, and connected to the sandwich structure 38 of the deformable portion 10.

After the rotary support mechanism 1 is formed, the head element 35 is formed on a rear end of the second rigid portion 12. Subsequently, after a medium opposed face protective film 39 is formed on the head element 35 and a lower face of the rear end of the second rigid portion 12 (the sliding face 22), the lower face of the rigid portion 12 is shaved by etching to form a sliding pad 40 (downward protrusion) constituting the sliding face. The protrusion including the medium opposed face protective film 39 is called the sliding pad 40.

The head element portion is detailed with reference to FIG. 8B. In a recording element 41, coils 41a of copper or aluminum alloy and magnetic poles 41b of permalloy soft magnetic films of iron-nickel alloy are formed. In a reproducing element 42, a magnetic resistance effect element 42a of a permalloy having a large magnetic resistance effect and a magnetic pole 42b of a permalloy soft magnetic film of iron-nickel alloy are formed. An electrode 43 is formed of copper or gold. A portion surrounding these element components is formed of $Al_2O_3$ which serves as an insulating and protective film. All these head element portions are successively formed by sputtering, evaporation, etching, plating and other thin-film forming technique. In the reproducing element 42, laminated films of permalloy and Co alloy, or a lamination of permalloy, Co alloy and NiO or other antiferromagnetic films can be formed. The magnetic pole 42b can be formed of a soft magnetic material such as Fe—Ni alloy, Co—Fe system alloy, Fe—Al—Si alloy or the like.

The positional relationship between the deformable portions 10 and 11 and the sliding face 22 is set in the same manner as in the first embodiment.

Therefore, the operation of the rotary support mechanism when the frictional force acts on the sliding face is the same as in the first embodiment of the invention.

Also, by forming the coils 41a in a plane of the rigid portion 12 in the medium movement direction, the entire rotary support mechanism 1 with the head element 35 built therein can further be low-profiled.

As is not shown in FIG. 8, actually in the same manner as in the embodiment of FIG. 2, the first and second deformable portions and the first rigid portion are divided into two in the width direction, for absorbing the setting error in the rolling direction. Instead, in the second rigid portion 12, the rolling-direction gimbal structure can be formed by etching, and the wirings 14 can be passed through the portions corresponding to the frame body 28 and the second support portion 30 of FIG. 5.

Figure 9A:
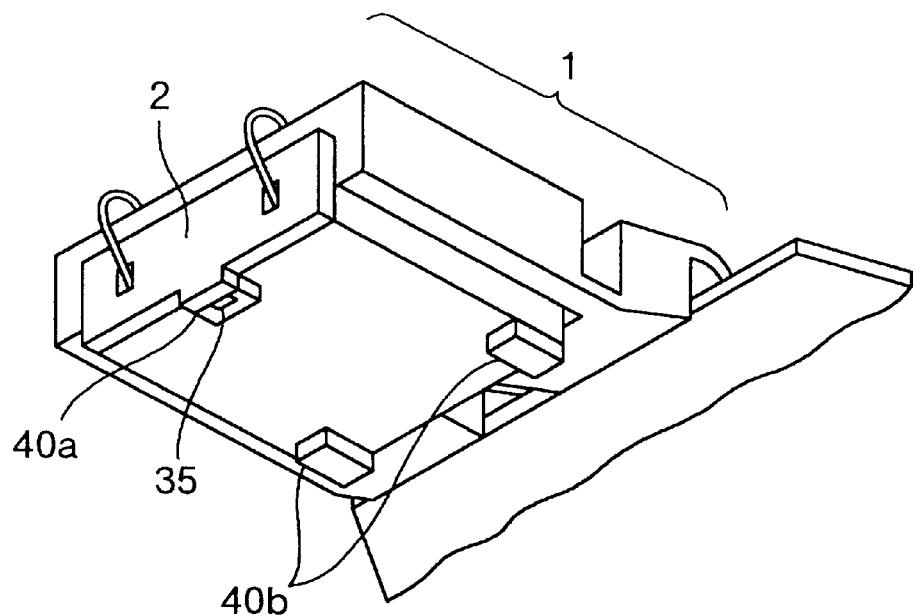
FIGS. 9A and 9B are perspective and side views showing in detail a slider according to a sixth embodiment of the invention, respectively.
Figure 9B:
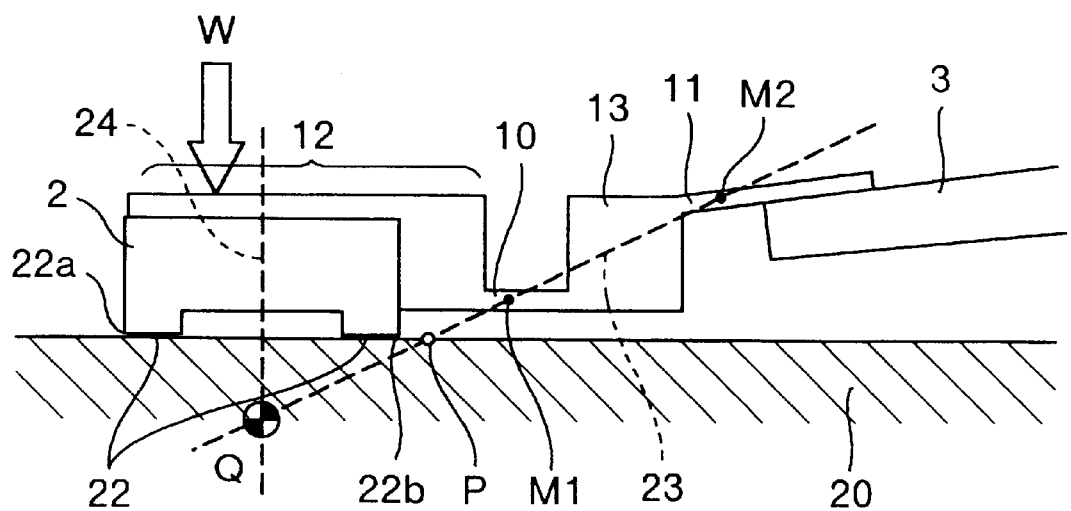

In a sixth embodiment shown in FIG. 9, the slider 2 of FIG. 1 has plural sliding pads. FIG. 9A is a perspective view of the slider 2 as seen from the sliding face, and FIG. 9B is a side view thereof. The slider 2 can be provided with the sliding pads. Preferably, an element pad 40a provided with the head element 35 is mounted on the rear end of the slider, and on the front end thereof, two sliding pads 40b are separately arranged. This three-pad system is preferable. In this case, the three pads define a plane corresponding to the disc face. The setting error is absorbed by the entire rotary support mechanism 1 in the pitching direction of the slider, and by the two-row support mechanism or the gimbal mechanism shown in FIG. 2 or 3 in the rolling direction, so that the attitude of the slider can be stabilized. Portions corresponding to the slider sliding portions 22a and 22b as shown in FIG. 3 are between a rearmost end of the sliding pad 40a and foremost ends of the sliding pads 40b. Therefore, in the rotary support mechanism 1, the intersection P of the extension 23 of the virtual line connecting the deformable portions with the disc face should be, as shown in FIG. 9B, set on the upstream side of the medium movement direction from the foremost end of the foremost sliding pad 40b.

In the magnetic disc device according to the embodiment of the invention shown in FIG. 10, the magnetic discs 20 are attached to the spindle motor 45, and rotate at 5400 rmp to 10000 rom. If performances of the spindle motor and the like permit, the rotation at a higher rotation frequency can be achieved. Further, the magnetic discs can be used on the side with a lower rotation frequency. Although multiple discs are mounted, FIG. 10B only shows a constitution between two discs. If the rotary support mechanism constituted as the aforementioned integrated structure body is used as in the embodiment, a distance between the discs can be easily narrowed, and the disc device can be preferably made thin. Also, the slider rotary support mechanism according to the aforementioned embodiments of the invention can be used.

The embodiments of the invention have been described with reference to the drawings. in either one of the embodiments, even when the frictional force acts, the slider stably slides. Therefore, the contact system in which the magnetic head slider is always in contact with the magnetic recording medium can be realized, thereby achieving a high recording density of 2 $Gbit/inch^2$.

Also, the magnetic disc device has been described in the embodiments. However, the invention is not restricted to the magnetic disc device, and can be applied to any other usual magnetic recording device in which the recording medium and the magnetic head or the member for supporting the magnetic head are slid. In the embodiments, as the magnetic head, the recording/reproducing element including the magnetic resistance effect element can be used. Alternatively, only an inductive head or another magnetic head, or a magnetic head using an optical element can be used.

In the aforementioned embodiments, the pitching means a rotary movement with a rotation axis parallel with the recording medium and vertical to the recording medium movement direction, and the rolling means a rotary movement with a rotation axis in the recording medium movement direction.

Further, in the drawings referred to in the embodiments, aspect ratios and dimensional ratios of the respective portions are not necessarily correct for convenience of description.

According to the invention, when the magnetic head slider slides in contact with the magnetic recording medium, the frictional force acts. Then, the load for pressing the slider onto the recording medium is decreased, and the forward portion of the slider is displaced to rise. Therefore, the unstable vibration caused when the slider falls forward and the generation of a local stress can be avoided, while the frictional force is effectively uniformed. Further, according to the invention, the magnetic recording device in the contact recording system can be effectively highly densified and largely volumed.

What is claimed is:

1. A magnetic recording device which comprises:
   a magnetic head for reading and/or writing with a magnetic recording medium which moves,
   a slider for holding said magnetic head on said magnetic recording medium,
   an actuator for moving said magnetic head,
   a support arm having a longitudinal axis, connected to said actuator, for supporting said slider, and
   a slider rotary support portion for attaching said slider to said support arm,
   said slider rotary support portion being provided with a first deformable portion, a first rigid portion, a second deformable portion and a second rigid portion which are arranged successively from said support arm in a direction of the longitudinal axis of said support arm,
   said slider being mounted on said second rigid portion, said first deformable portion and said second deformable portion being elastically deformed in a plane which is substantially perpendicular to a recording face of said recording medium and parallel with an axial line connecting said first deformable portion and said second rigid portion by a frictional force exerted on said slider during movement of said slider on said recording medium, an upstream end of a sliding portion of said slider with said magnetic recording medium in the movement direction of the magnetic recording medium being positioned, with said magnetic recording medium being stopped, on a downstream side of said movement direction of the magnetic recording medium, from an intersection of an extension of a virtual line connecting said first deformable portion and said second deformable portion with the recording face of said magnetic recording medium, the virtual line extending in a direction along and transverse to the longitudinal axis of said support arm.

2. A magnetic recording device which comprises:

a magnetic head for reading and/or writing with a magnetic recording medium which moves, a slider for holding said magnetic head on said magnetic recording medium, an actuator for moving said magnetic head, a support arm having a longitudinal axis, connected to said actuator, for supporting said slider, and a slider rotary support portion for attaching said slider to said support arm, said slider rotary support portion being provided with a first deformable portion, a first rigid portion, a second deformable portion and a second rigid portion which are arranged successively from said support arm in a direction of the longitudinal axis of said support arm, said slider being mounted on said second rigid portion, said first deformable portion and said second deformable portion being elastically deformed in a plane which is substantially perpendicular to a recording face of said recording medium and parallel with an axial line connecting said first deformable portion and said second rigid portion by a frictional force exerted on said slider during reading or writing movement of said slider on said recording medium, an intersection of a first virtual line perpendicular to a sliding portion of said slider with an extension of a second virtual line connecting said first deformable portion and said second deformable portion being located on the recording face or an inner periphery side of said recording medium, the second virtual line extending in a direction alone and transverse to the longitudinal axis of said support arm.

* * * * *